Patented Dec. 30, 1941

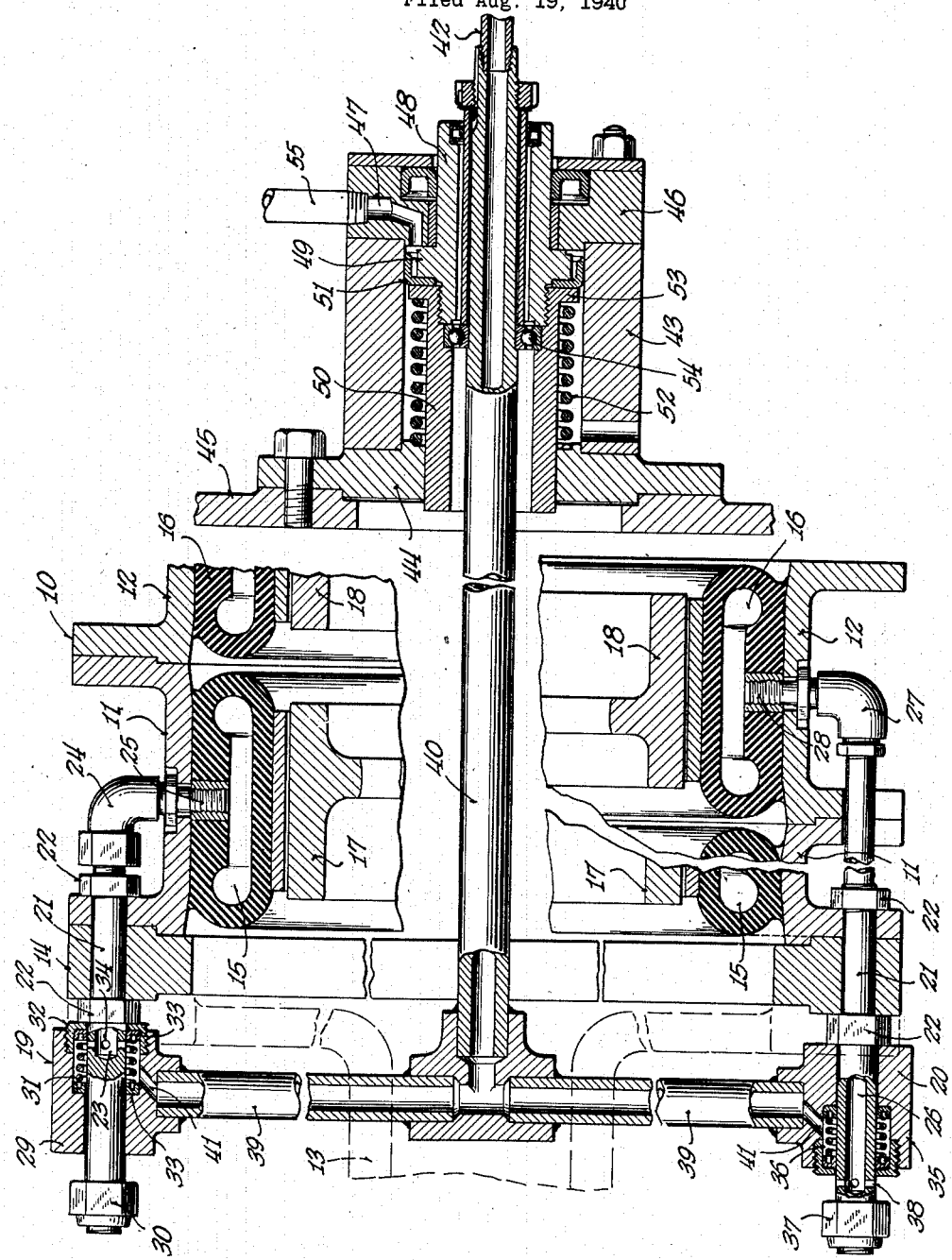

2,268,143

UNITED STATES PATENT OFFICE 2,268,143

CLUTCH CONTROL MEANS

Walter P. Schmitter, Wauwatosa, and Daniel M. Schwartz, Shorewood, Wis., assignors to The Falk Corporation, Milwaukee, Wis., a corporation of Wisconsin Application August 19, 1940, Serial No. 353,224

9 Claims. (Cl. 192—87)

This invention relates to control means for fluid pressure clutches.

In the copending application of Walter P. Schmitter, Serial No. 301,930, filed October 30, 1939, a power transmission is disclosed driven and controlled by a pair of selectively operable coaxial clutches arranged side by side. Each of the clutches therein disclosed includes a fluid pressure gland expansible to close the clutch, the glands of the clutches being separately controlled by fluid conducting means extending axially through both clutches. The present invention may be advantageously employed as a dual clutch controller in a power transmission system of that type.

One object of the present invention is to provide a controller for fluid pressure clutches so constructed as to permit disposition of the control valve immediately adjacent the fluid pressure element of the clutch. This is important for prompt action particularly when the fluid pressure element and fluid conducting means are of substantial capacity. This we have accomplished by an arrangement wherein the clutch control valve is disposed substantially at the periphery of the clutch.

Another object is to provide in a clutch controller of the character mentioned reliable means for controlling a peripherally disposed clutch valve while the clutch is in operation.

Another object is to utilize the fluid conducting means as a controller for a peripherally disposed clutch valve.

Another object is to provide an improved unitary means for the simultaneous control of a pair of adjacent selectively operable fluid pressure clutches.

Another object is to provide a power actuated means for the simultaneous control of a pair of adjacent selectively operable clutches.

Other more specific objects and advantages will appear from the following description of a clutch controller constructed in accordance with the present invention.

The single figure of the accompanying drawing is a sectional view of a clutch controller embodying the present invention and shown applied to an adjacent pair of selectively operable fluid pressure clutches.

The two clutches shown are of the type disclosed in the pending application hereinabove identified. They include a driving drum 10, which is common to both, and which is made up of two attached flanged ring sections 11 and 12 connected to a driving rotor 13 through an adapter ring 14.

The inner drums 17 and 18 are independently mounted and separately connected to a power transmission to drive the latter in one direction or the other, dependent upon which of them is engaged by the surrounding gland 15 or 16, all as disclosed in the copending application above identified.

In this instance the gland 15 is controlled by a valve 19 and gland 16 by a similar valve 20, both valves being carried by an end of the drum 10 at diametrically opposite points on the periphery thereof. Each of the valves 19 and 20 includes a rod 21 extending rearwardly through and from the ring 14 and anchored thereto by appropriate means such as clamp nuts 22 threaded thereon. The rod 21 of valve 19 is provided with a longitudinal duct 23 in its forward end which communicates with the gland 15 through appropriate means such as a fitting 24 and nipple 25; and the rod 21 of valve 20 is provided with a similar duct 26 which communicates with the gland 16 through a fitting 27 and nipple 28.

The valve 19 also includes a head 29 closely fitted to slide along the rod 21 between the adjacent nut 22 and a limiting stop in the form of a nut 30 on the rear end of the rod. In that end of the head 29 adjacent the nut 22 is a chamber 31 closed by a flanged ring 32 and sealed by appropriate spring pressed end seals 33 surrounding the rod. The arrangement is such that, when the head 29 is in the forward position shown, the chamber 31 therein communicates with the duct 23 through radial ports 34 in the rod 21, but when shifted rearwardly against the stop nut 30 the ports 34 are uncovered by the head, and the duct 23, and consequently the gland 15, are open to the atmosphere.

The valve 20 also includes a similar head 35 having a similar chamber 36 arranged in that end thereof toward a similar stop nut 37 but adapted to communicate with the duct 26 through ports 38 when the head is shifted rearwardly against the nut 37. With the head 35 in the forward position shown, the ports 38 are uncovered and the duct 26 and gland 16 are open to the atmosphere.

The heads 29 and 35 of both valves are rigidly connected to pipes 39 which in turn are rigidly connected with a pipe 40 disposed axially of the clutches and extending loosely therethrough. This system of pipes functions as an actuator and controller for the valves and also as a means for conducting fluid pressure thereto, the chambers 31 and 36 in the heads being connected to the pipes 39 through ports 41, and the forward end of pipe 40 being connectable to any appropriate source of fluid pressure through an appropriate connection 42.

It will of course be understood that the pipe 40 and connected pipes 39 rotate as a unit with the driving clutch drum 12, and that they are also shiftable axially of the drum to effect simultaneous shifting of the valve heads 29 and 35 along their supporting rods 21.

This axial shifting of the pipe 40 may be accomplished manually but in this instance fluid pressure means is provided for that purpose. The means shown comprises a stationary cylinder 43 closed at its rear end by a supporting disk 44 fixed thereto and attached to a suitable part 45 of the transmission housing. The forward end head 46 of the cylinder contains a duct 47 communicating with the interior thereof and having a central opening to accommodate the projecting end of the sleeve 48 of a piston 49. The rear end of the piston sleeve 48 is attached to a supporting sleeve 50, and a cup packing 51 therebetween provides a seal between the piston and cylinder. The sleeve 50 is guided in an appropriate opening in the end disk 44 and is urged forwardly by a surrounding spring 52 confined between the disk 44 and a flange 53 on the sleeve. The forward end of the pipe 40 is supported by an end thrust bearing 54 axially fixed thereto and to the sleeve 50, so that the pipe 40 is free to rotate with respect to the sleeve but is restrained to move longitudinally therewith. Fluid pressure may be supplied to the cylinder through a suitable connection 55 communicating with the duct 47.

The arrangement is such that the spring 52 yieldably retains the piston 49 in the forward position shown, in which position the pipes 40 and 39 and valve heads 29 and 35 are in the advanced position shown, with the gland 15 in communication with the pipes through the ports 41 and 34 and duct 23, and with the gland 16 open to the atmosphere through the duct 26 and ports 38. With the ports thus disposed and with fluid pressure in the pipe 40, the gland 16 is of course deflated and the gland 15 expanded into gripping engagement with the clutch drum 17 by the fluid pressure transmitted through the duct 23.

By admitting fluid pressure through the connection 55 and duct 47, the piston 49 is forced rearwardly, thereby shifting the pipes 40 and 39 and valve heads 29 and 35 rearwardly until engaged by the stop nuts 30 and 37, in which position the gland 15 is promptly deflated by exhausting through the duct 23 and adjacent ports 34, and the gland 16 is promptly expanded into gripping engagement with the drum 18 by the admission thereto of fluid pressure from the pipes 40 and 39 through ports 41 and 38, and duct 26.

It will thus be understood that so long as fluid pressure is present in the pipe 40, one or the other of the clutch glands 15 or 16 will be expanded and the other deflated, so that one or the other of the clutches is closed and the other open, dependent upon whether the connection 55 is exposed to fluid pressure or open to exhaust; and that regardless of the condition of the conduit 55 both clutch glands 15 and 16 will be deflated and both clutches open whenever the connection 42 is open to exhaust. It will also of course be understood that the connections 55 and 42 include appropriate means for exposing them to pressure or exhaust and the latter also of course includes any well known or appropriate joint for permitting rotation thereof relative to the pressure source.

Various changes may be made in the embodiment of the invention hereinabove specifically described without departing from or sacrificing the advantages of the invention as defined in the appended claims.

We claim:

1. The combination with a rotary fluid pressure clutch, of a control valve therefor disposed adjacent the periphery thereof, and means for conducting fluid pressure to said valve, said means including a member rotatable with said clutch and moveable relative thereto for operating said valve.

2. The combination with a rotary clutch having a fluid pressure chamber, of a control valve disposed adjacent the periphery thereof and having a duct communicating with said chamber, means for conducting fluid pressure to said duct, said means including a member rotatable with said clutch and moveable relative thereto to selectively make or break communication between said means and said duct.

3. The combination with a rotary clutch having a fluid pressure chamber, of means for conducting fluid pressure to said chamber, and a valve disposed adjacent the periphery of said clutch and comprising coacting elements relatively moveable to connect said chamber to said fluid conducting means or to the atmosphere, selectively, said fluid conducting means including a member rotatable with said clutch and moveable relative thereto to control said valve.

4. The combination with a rotary fluid pressure clutch, of a control valve therefor disposed adjacent the periphery thereof, and means for conducting fluid pressure to said valve, said means including a member extending axially through said clutch and axially moveable to operate said valve.

5. The combination with two rotary fluid pressure clutches, of separate valves for controlling said clutches, and means for conducting fluid pressure to both of said valves, said means including a fluid-containing member moveable to operate both of said valves.

6. The combination with two rotary fluid pressure clutches, of separate valves for controlling said clutches, said valves being spaced apart adjacent the periphery of said clutches, and fluid conducting means connected with both of said valves and moveable to operate the same.

7. The combination with two rotary fluid pressure clutches, of separate valves for controlling said clutches, said valves being disposed at diametrically spaced positions along the periphery of said clutches, and fluid conducting means connected with said valves and moveable to operate the same, said means including a member coaxially disposed with respect to said clutches.

8. The combination with two rotary fluid pressure clutches, of separate valves for controlling said clutches, one of said valves including an element moveable in one direction to close its associated clutch and in the opposite direction to open the latter, the other of said valves including an element moveable in said first named direction to open its associated clutch and in the opposite direction to close the latter, and means containing a fluid pressure conduit for conducting fluid to said valves, said means being connected to both of said elements and moveable to actuate the same.

9. The combination with two rotary fluid pressure clutches, of valve means for controlling the same, fluid conducting means connected with said valve means and moveable to operate the same, and fluid actuated means for actuating said conducting means.

DANIEL M. SCHWARTZ.
WALTER P. SCHMITTER.